(12) United States Patent
Oksman

(10) Patent No.: US 11,101,844 B2
(45) Date of Patent: Aug. 24, 2021

(54) INTERFERENCE MITIGATION

(71) Applicant: Lantiq Beteiligungs-GmbH & Co. KG, Neubiberg (DE)

(72) Inventor: Vladimir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 515 days.

(21) Appl. No.: 15/631,702

(22) Filed: Jun. 23, 2017

(65) Prior Publication Data

US 2017/0295044 A1 Oct. 12, 2017

Related U.S. Application Data

(63) Continuation of application No. 15/128,687, filed as application No. PCT/EP2015/055731 on Mar. 18, 2015.

(Continued)

(51) Int. Cl.
*H04B 3/32* (2006.01)
*H04B 3/54* (2006.01)
(Continued)

(52) U.S. Cl.
CPC ............ *H04B 3/32* (2013.01); *H04B 3/487* (2015.01); *H04B 3/54* (2013.01); *H04L 25/085* (2013.01); *H04M 7/0024* (2013.01)

(58) Field of Classification Search
CPC ............. H04B 3/32; H04B 3/54; H04B 3/487
See application file for complete search history.

(56) References Cited

U.S. PATENT DOCUMENTS 2,464,026 A * 3/1949 Clark .................... H01F 27/402
174/11 R
2,616,968 A * 11/1952 Slooten ................. H03G 11/004
323/229

(Continued)

FOREIGN PATENT DOCUMENTS

CN 110036625 A * 7/2019 ............ H04B 3/542
EP 1733550 A1 * 12/2006 ......... H04L 12/6418
(Continued)

OTHER PUBLICATIONS

Mantri et al. "G.hn, G.vdsl, G.fast : Powerline Interference Indication and Mitigation for DSL transceivers; C 0175", ITU-T Draft; Study Period 2013-2016,International Telecommunication Union, Geneva ; CH,vol. 18/15,4/15, Sep. 4, 2013 (Sep. 4, 2013), pp. 1-16 (a prior art NPL provided in the IDS filed Jun. 23, 2017 by the applicant).*

(Continued)

*Primary Examiner* — Berhanu Tadese
(74) *Attorney, Agent, or Firm* — 2SPL Patent Attorneys PartG mbB; Yong Beom Hwang

(57) ABSTRACT

A PLC modem (131-133) is prompted to increase, starting from a predetermined minimum transmit power, a transmit power of data transmission on a PLC channel (112) at a given time or time period defined with respect to a mutual time reference of a DSL channel (111) and the PLC channel (112). A DSL modem (121) is prompted to measure a signal-to-noise value at the given time or time period defined with respect to the mutual time reference. Mitigation of interference 190 between the PLC channel (112) and the DSL channel (111) becomes possible.

18 Claims, 8 Drawing Sheets

Related U.S. Application Data

(60) Provisional application No. 61/970,350, filed on Mar. 25, 2014, provisional application No. 62/077,376, filed on Nov. 10, 2014.

(51) Int. Cl.
  *H04B 3/487* (2015.01)
  *H04L 25/08* (2006.01)
  *H04M 7/00* (2006.01)

(56) References Cited

U.S. PATENT DOCUMENTS

| | | | | |
|---|---|---|---|---|
| 5,808,507 | A * | 9/1998 | Melse | G05F 3/265 327/538 |
| 6,014,686 | A * | 1/2000 | Elnozahy | G06F 9/465 709/202 |
| 6,266,367 | B1 * | 7/2001 | Strait | H03H 21/0012 370/286 |
| 6,999,504 | B1 * | 2/2006 | Amrany | H04L 5/20 370/201 |
| 7,349,480 | B2 * | 3/2008 | Tsatsanis | H04B 3/32 375/257 |
| 7,471,732 | B2 * | 12/2008 | Tsatsanis | H04B 3/32 375/260 |
| 7,522,515 | B2 * | 4/2009 | Tsatsanis | H04B 3/32 370/210 |
| 8,139,658 | B2 * | 3/2012 | Tsatsanis | H04B 3/32 375/260 |
| 8,194,767 | B2 * | 6/2012 | Duvaut | H04L 1/0042 375/260 |
| 8,509,050 | B2 * | 8/2013 | Hobbel | H04B 3/466 370/201 |
| 8,687,770 | B2 * | 4/2014 | Alloin | H04M 3/306 379/1.04 |
| 8,774,256 | B2 * | 7/2014 | Cendrillon | H04L 1/0026 375/222 |
| 8,908,834 | B2 * | 12/2014 | Tu | H04B 3/32 379/32.04 |
| 9,088,350 | B2 * | 7/2015 | Pereira | H04B 3/487 |
| 9,143,195 | B2 * | 9/2015 | Chu | H04B 3/32 |
| 9,225,826 | B2 * | 12/2015 | Shi | H04M 3/007 |
| 9,264,075 | B2 * | 2/2016 | Schoppmeier | G06F 3/0613 |
| 9,270,333 | B2 * | 2/2016 | Lu | H04B 3/32 |
| 9,391,668 | B2 * | 7/2016 | Parnell | H04B 3/54 |
| 9,398,146 | B2 * | 7/2016 | Kerpez | H04B 3/32 |
| 9,473,240 | B2 * | 10/2016 | Gupta | H04B 10/27 |
| 9,490,872 | B2 * | 11/2016 | Sands | H04B 3/487 |
| 9,584,182 | B2 * | 2/2017 | Fisher | H04M 11/062 |
| 9,806,762 | B2 * | 10/2017 | Wang | H04M 11/062 |
| 9,948,371 | B2 * | 4/2018 | Fazlollahi | H04B 7/0456 |
| 9,985,685 | B2 * | 5/2018 | Yin | H04B 3/487 |
| 10,063,278 | B2 * | 8/2018 | Cendrillon | H04B 3/32 |
| 10,097,236 | B2 * | 10/2018 | Al Rawi | H04B 3/32 |
| 10,148,415 | B2 * | 12/2018 | Shi | H04L 25/14 |
| 10,284,713 | B2 * | 5/2019 | Flowers | H04B 3/46 |
| 10,819,498 | B2 * | 10/2020 | Al Rawi | H04B 3/32 |
| 10,826,560 | B2 * | 11/2020 | Tsiaflakis | H04B 3/32 |
| 10,938,427 | B2 * | 3/2021 | Ginis | H04B 1/10 |
| 2008/0031313 | A1 * | 2/2008 | Oksman | H04L 27/2608 375/222 |
| 2010/0049618 | A1 * | 2/2010 | Smith | G06Q 30/00 705/26.1 |
| 2011/0051786 | A1 * | 3/2011 | Schwager | H04B 3/54 375/222 |
| 2011/0080937 | A1 * | 4/2011 | Kim | H04L 5/0007 375/219 |
| 2012/0057483 | A1 * | 3/2012 | Kim | H04L 27/2602 370/252 |
| 2013/0279552 | A1 | 10/2013 | Gomez Martinez | |
| 2014/0105262 | A1 * | 4/2014 | Alloin | H04L 27/2688 375/222 |
| 2014/0153630 | A1 * | 6/2014 | Strobel | H04L 25/03343 375/229 |
| 2014/0208126 | A1 * | 7/2014 | Mooney | G06F 1/266 713/300 |
| 2014/0307572 | A1 | 10/2014 | Mungall | |
| 2014/0369430 | A1 * | 12/2014 | Parnell | H04M 3/34 375/257 |
| 2015/0009793 | A1 * | 1/2015 | Schwager | H04B 3/32 370/201 |
| 2016/0105215 | A1 * | 4/2016 | Wang | H04M 3/007 370/201 |
| 2016/0212036 | A1 * | 7/2016 | Oksman | H04B 3/32 |
| 2016/0294441 | A1 * | 10/2016 | Fazlollahi | H04B 7/15507 |
| 2017/0295044 | A1 * | 10/2017 | Oksman | H04B 3/32 |
| 2018/0034618 | A1 * | 2/2018 | Al Rawi | H04B 3/50 |
| 2020/0395979 | A1 * | 12/2020 | Tsiaflakis | H04B 3/04 |

FOREIGN PATENT DOCUMENTS

| | | | | |
|---|---|---|---|---|
| EP | 2356790 | A2 * | 8/2011 | H04M 11/062 |
| EP | 2876872 | A1 * | 5/2015 | H04B 3/487 |
| EP | 3123618 | A1 * | 2/2017 | H04B 3/487 |
| EP | 3266109 | A1 * | 1/2018 | H04L 25/03343 |
| GB | 2561010 | A * | 10/2018 | H04B 3/32 |
| KR | 101099389 | B1 * | 12/2011 | H04B 3/32 |
| WO | 2013/089757 | A1 | 6/2013 | |
| WO | WO-2013089757 | A1 * | 6/2013 | H04W 52/225 |
| WO | WO-2015144538 | A1 * | 10/2015 | H04B 3/32 |

OTHER PUBLICATIONS

ITU-T Rec. G.9964 Unified high-speed wireline-based home networking transceivers—Power spectral density specification, Dec. 2011.*

Ali Khaled et al., DSL and PLC Co-Existence—An Interference Cancellation Approach, IEEE Sep. 2014.*

ITU-T Rec. G.9972 (Jun. 2010) Coexistence mechanism for wireline home networking transceivers, Jun. 2010.*

ITU-T Rec. G.997.1 (Apr. 2009) Physical layer management for digital subscriber line (DSL) transceivers.*

Mantri, Ravi etal. G.hn. G.vdsi. Giast Powerline Interference indication and Mitigation for DSL transceivers. Metanoia Technologies Inc., AT&T Inc, COM 15-C 0175-E, International Telecommunication Union, Telec.*

International Search Report for PCT/EP2015/055731 dated Jun. 2, 2015.

Mantri, Ravi et al. "G.hn. G.vdsl, G.fast: Powerline Interference Indication and Mitigation for DSL transceivers." Metanoia Technologies Inc., At&T Inc. COM 15-C 0175-E. International Telecommunication Union. Telecommunication Standardization Section, Study Period 2013-2016. Jul. 2013. 16 pages.

Galli, Stefano et al. "A first statistical model of PLC interference on twisted pairs." ITU—Telecommunication Standardization Section, PLC into DSL Model ASSIA Orange. Q4/15 and Q18/15. Teleconference Mar. 3, 2014. Temporary Document 2014-03-Q4 27 pages.

Oksman, Vladimir et al. "G.vdsl: Proposal to specify VDSL2 protection mode in G.hn," Lantiq, Ikenos. ITU—Telecommunication Standardization Section. Study Group 15. Temporary Document 2013-09-Q4-084. Barcelona, Spain, Oct. 2013. 5 pages.

Mantri, Ravi et al. "G.hn. G.vdsl, G.fast: Powerline Interference Indication and Mitigation for DSL transceivers." Metanoia Technologies Inc., At&T Inc. COM 15-C 0175-E. International Telecommunication Union. Telecommunication Standardization Sector. Study Period 2013-2016. Question 18/15, 4/15. Geneva, Switzerland. Jul. 2013.

Mantri, Ravi et al. "G.hn, G.vdsl, G.fast: Objectives and Tools for PLC to DSL Interference Mitigation." Metanoia Technologies. International Telecommunication Union. Telecommunication Standardization Section. Study Period 2013-2016. Question 4,18/15, Study Group 16—Contribution 0509. COM 15-C 0509-E. Mar. 2014. Geneva, Switzerland. 3 pages.

U.S. Appl. No. 15/128,687, filed Sep. 23, 2016.

Moulin, Fabienne et al. "PLC and VDSL2 coexistence." Experimental Study. IEEE 2010, pp. 207-212.

(56) References Cited

OTHER PUBLICATIONS

International Preliminary Report on Patentability, International Application No. PCT/EP2015/055731, dated Sep. 27, 2016.
Non-Final Office Action dated Apr. 6, 2018 in connection with U.S. Appl. No. 15/128,687.
Non-Final Office Action dated Jan. 22, 2019 in connection with U.S. Appl. No. 15/128,687.
Non-Final Office Action dated Jul. 30, 2019 in connection with U.S. Appl. No. 15/128,687.
Final Office Action dated Feb. 12, 2020 in connection with U.S. Appl. No. 15/128,687.

* cited by examiner

INTERFERENCE MITIGATION

This application is a continuation of U.S. application Ser. No. 15/128,687 filed on Sep. 23, 2016, which claims the benefit of International Patent Application No. PCT/EP2015/055731 filed on Mar. 18, 2015, which claims priority to U.S. Provisional Application No. 61/970,350 filed on Mar. 25, 2014, and U.S. Provisional Application 62/077,376 filed on Nov. 10, 2014, the contents of which are herein incorporated by reference in their entirety.

FIELD

Various embodiments relate to a method of interference mitigation between a Digital Subscriber Line channel and a Power Line Communication channel, and to a corresponding de-vice. In particular, various embodiments relate to crosstalk estimation by controlling a Power Line Communication modem and a Digital Subscriber Line modem to operate with a mutual time reference.

BACKGROUND

The Digital Subscriber Line (DSL) technology, during all its history, attempted to increase the bit rate in the aim to deliver more broadband services to the customer. Copper loops deployed from the Central Office (CO) to customer premises equipment (CPE) are rather long and typically do not allow transmission of data with bit rates more than few Mb/s. Therefore, to increase the customer available bit rates, modern access networks use street cabinets, Multi-Dwelling Unit (MDU) cabinets, and similar arrangements: the cabinet is connected to the CO by a high-speed fiber communication line, e.g., gigabit passive optical network (GPON) and installed close to the customer premises. From these cabinets, high-speed DSL systems, such as Very-High-Bit-Rate DSL (VDSL2), provide connection to the CPE.

Further, vectored VDSL2 systems were introduced, e.g. as International Telecommunication Union Telecommunication Standardization Sector (ITU-T) Rec. G.993.5, to further increase the bit rate. In vectored systems, mutual far-end crosstalk is reduced which significantly reduces the total noise at the receiver. The bit rates achieved by vectored DSL are typically around 100 Mb/s, which reflects the performance level currently required by service providers. Recently, a new type of DSL, referred as G.fast, was standardized by the ITU. G.fast also uses vectoring to cancel crosstalk and further increases service bit rates to 1 Gb/s.

However, to ensure a sustainable high bit rate in DSL systems, the level of the background noise, i.e., generated by non-DSL systems, shall also be low. This is sometime difficult to achieve because of limited influence on interference originating from other systems. This is because other systems may not be or only partly be under the control of the DSL system operator.

SUMMARY

Therefore, it is an object of the present invention to mitigate background noise in a DSL network, in particular background noise caused by another system.

This need is met by the features of the independent claims. The dependent claims define embodiments.

According to an aspect, a method of interference mitigation between a DSL channel and a PLC channel is provided. The method comprises providing, to at least one PLC modem of the PLC channel, instructions to commence crosstalk estimation. Said instructions prompt the at least one PLC modem to increase, starting from a predetermined minimum transmit power, a transmit power of data transmission on the PLC channel at a given time or time period. The given time or time period is defined with respect to a mutual time reference of the DSL channel and the PLC channel. The method further comprises providing, to a DSL modem of the DSL channel, further instructions to commence the crosstalk estimation. The further instructions prompt the DSL modem to measure a signal-to-noise value at the given time or time period defined with respect to the mutual time reference.

In various embodiments, it may be possible that the instructions prompt the at least one PLC modem, prior to said increasing of the transmit power, to reduce the transmit power to the predetermined minimum transmit power. The transmit power may be a Power Spectrum Density (PSD).

According to a further aspect, a device is provided. The device comprises at least one interface. The at least one interface is configured to provide, to at least one PLC modem of a PLC channel, instructions to commence crosstalk estimation. Said instructions prompt the at least one PLC modem to increase, starting from a predetermined minimum transmit power, a transmit power of data transmission on the PLC channel at a given time or time period. The given time or time period is defined with respect to a mutual time reference of the DSL channel and the PLC channel. The at least one interface is further configure to provide, to a DSL modem of a DSL channel, further instructions to commence the crosstalk estimation. The further instructions prompt the DSL modem to measure a signal-to-noise value at a given time or time period defined with respect to the mutual time reference.

According to a further aspect, a method of interference mitigation between a DSL channel and a PLC channel is provided. The method comprises establishing instructions to commence crosstalk estimation. The method further comprises, in response to said establishing the instructions, increasing, starting from a predetermined minimum transmit power, a transmit power of data transmission on the PLC channel at a given time or time period. The given time or time period is defined with respect to a mutual time reference of the DSL channel and the PLC channel.

According to a further aspect, a PLC modem is provided. The PLC modem comprises at least one processor configured to establish instructions to commence crosstalk estimation. The PLC modem further comprises an interface. The interface is configured to execute data transmission on a PLC channel. The at least one processor, in response to said establishing of the instructions, is configured to control the interface to increase, starting from a predetermined minimum transmit power, a transmit power of the data transmission on the PLC channel at a given time or time period. The given time or time period is defined with respect to a mutual time reference of the DSL channel and the PLC channel.

According to a further aspect, a method of interference mitigation between a DSL channel and a PLC channel is provided. The method comprises establishing instructions to commence crosstalk estimation. The method further comprises, in response to said establishing of the instructions to commence crosstalk estimation, measuring a signal-to-noise value at a given time or time period. The given time or time period is defined with respect to a mutual time reference of the DSL channel and the PLC channel.

According to a further aspect, a DSL modem is provided. The DSL modem comprises at least one processor configured to establish instructions to commence crosstalk estimation. The at least one processor, in response to said establishing of the instructions, is configured to measure a signal-to-noise value at a given time or time period. The given time or time period is defined with respect to a mutual time reference of the DSL channel and the PLC channel.

It is to be understood that the features mentioned above and features yet to be explained below can be used not only in the respective combinations indicated, but also in other combinations or in isolation, without departing from the scope of the present invention. Features of the abovementioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
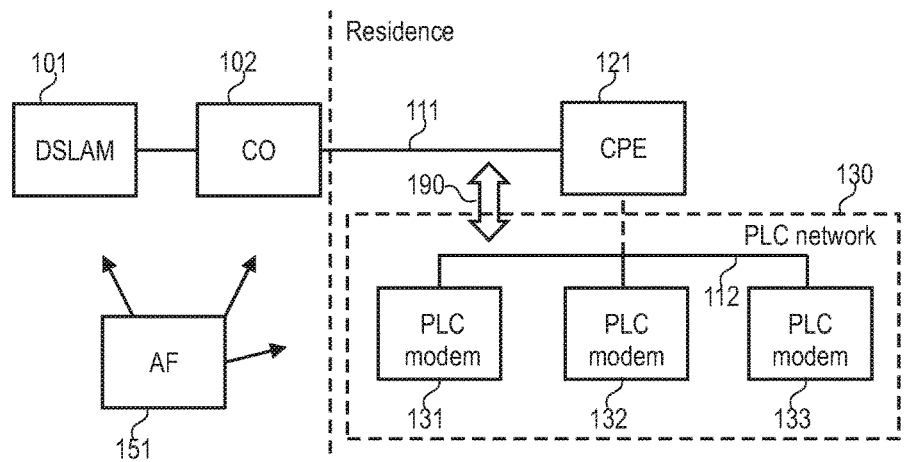
FIG. 1 schematically illustrates a DSL channel co-located with a PLC channel, as well as an application function centrally controlling interference mitigation between the PLC channel and the DSL channel.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings which are taken to be illustrative only.

The drawings are to be regarded as being schematic representations and elements illustrated in the drawings are not necessarily shown to scale. Rather, the various elements are represented such that their function and general purpose becomes apparent to a person skilled in the art. Any connection or coupling between the functional blocks, devices, components, or other physical or functional unit shown in the drawings or described herein may also be implemented by an indirect connection or coupling. A coupling between components may also be established over a wireless connection. Functional blocks may be implemented in hardware, firmware, software, or a combination thereof.

The present application is based on the finding that one substantial source of interference present in DSL channels are PLC systems installed in close vicinity, e.g., in the same apartment, and operating in the same or overlapping range of frequencies. Details may be found in F. Moulin, P. Péron, A. Zeddam "PLC and VDSL2 Coexistence" in Powerline Communications and Its Applications, 2010; and O. Assia "A First Statistical Model of PLC Interference on Twisted Pairs", ITU-T SG15/Q4 Contribution, Teleconference Mar. 3, 2014.

Hereinafter, techniques are presented that allow providing a solution when a DSL system operates in the presence of a PLC system operating at the same premises or inside the range of mutual control, i.e., where a coupling point causing crosstalk between the DSL system and the PLC system exists.

A typical scenario of co-existence between a DSL channel 111 and a PLC channel 112 is illustrated in FIG. 1. The CO 102 is connected with the CPE 121 via, e.g., copper wiring. The CPE 121 implements a DSL modem. The CO 102, at the near-end side, is connected with a DSL access multiplexer (DSLAM) which is configured to establish a communication connection with a core network (not shown in FIG. 1).

As can be seen from FIG. 1, three PLC modems 131, 132, 133 form a PLC network 130 and participate in transmitting on the PLC channel 112. It is possible that there is a plurality of PLC channels 112 established between the different PLC modems 131, 132, 133. There may or there may not be a communication connection established between the DSL system and the PLC network 130, e.g., via the CPE 121. Indicated in FIG. 1 is crosstalk or interference 190 between the DSL channel 111 and the PLC channel 112. Further shown in FIG. 1 is an Application Function (AF) 151.

Figure 2:
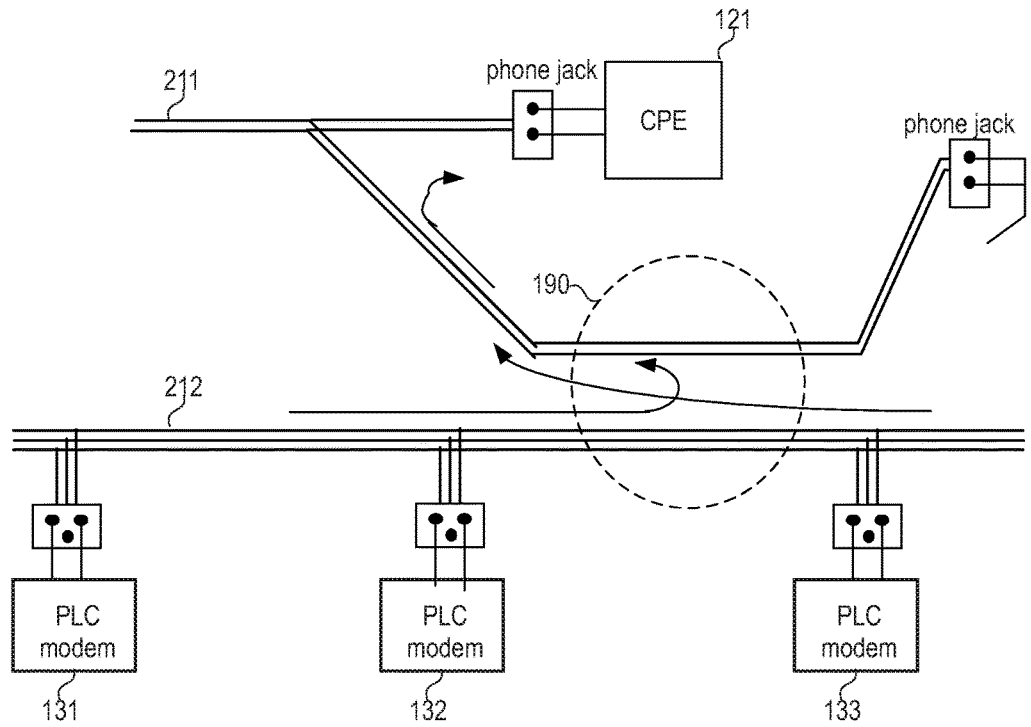
FIG. 2 illustrates crosstalk between the co-located DSL channel and PLC channel at a coupling point.

This typical scenario of in-home deployment is further presented in FIG. 2. Here, the DSL is a VDSL system, e.g. VDSL2 as per ITU-T Rec. G.993.2 or ITU-T Rec. G.993.1, and is connected to the phone wiring 211. The PLC modems 131, 132, 133 are connected to the power line wiring 212. There is crosstalk 190 between the PLC modem 131-133 connected to a particular power outlet and the phone wiring, which depends on the location of the outlet: thus different PLC modems 131-133 generate different crosstalk noise 190 into the DSL modem 121. In FIG. 1, PLC modem 132 is expected to generate more crosstalk 190 into the DSL channel 111 than PLC modems 131 and 133 because modems 131 and 133 are at bigger distance from the zone of physical proximity of phone wires 211 and powerline wires 212. In real home installations there could be multiple coupling zones, which number, location, and values of crosstalk coupling depend on particular wiring 211, 212 topology of a particular house or apartment.

In the example presented in FIG. 2, to maintain low crosstalk noise from PLC channel 112 into DSL channel 111, the PLC modem 132 may require a substantial PSD reduction in the downstream DSL frequency bands, while PLC modems 131 and 133 may be allowed to transmit higher signal levels or PSDs due to lower crosstalk coupling 190.

It should be noticed that no communication channel naturally exists between PLC modems 131-133 and the DSL modem 121 because:
 the DSL modem 121 and the PLC modems 131-133 use different transmission technology;
 the DSL modem 121 and the PLC modems 131-133 use different frequency spectrum; and/or no physical channel, except the crosstalk channel 190, exists between the PLC modems 131-133 and the DSL modem 121.

The invention offers a way to establish a mutual adjustment of the PLC modems 131-133 and the DSL modem 121 using the AF 151, which:

has an access to the DSL modem 121;

has an access to the PLC modems 131-133; and can provide arbitration between the PLC modems 131-133 and the DSL modem 121 based on the criterion established by the user, e.g., a third party, which owns the AF; usually the broadband service provider.

Here, the AF 151 is configured to provide, via a respective interface, to at least some of the PLC modems 131-133 of the PLC channel 112, instructions to commence crosstalk estimation. Where the AF 151 is co-located with one of the PLC modems 131-133 and/or the DSL modem 121, these instructions may be provided by an internal logical interface. Where the AF 151 is not co-located, the instructions may be physically sent, e.g., as part of a control message.

These instructions prompt the given PLC modems 131-133 to increase, starting from a predetermined minimum transmit power, a transmit power of data transmission on the PLC channel 112 at a given time or time period. The given time or time period is defined with respect to a mutual time reference of the DSL channel 111 and the PLC channel 112.

These instructions may further prompt the given PLC modems 131-133 to reduce—prior to said increasing—the transmit power of the PLC channel 112 to the predetermined minimum transmit power. Generally, the predetermined minimum transmit power corresponds to a power level that is estimated as causing sufficiently low interference to safely perform necessary procedures in the DSL channel 111, such as initializing or keeping error-free at Showtime.

Said increasing may commence gradually until DSL parameters can still be sustained. I.e., it is possible by to determine a target transmit power which is causing interference still acceptable for operation of the DSL channel 111.

The AF 151 is further configured to provide to the DSL modem 121 of the DSL channel 111 further instructions to commence the crosstalk estimation. These further instructions prompt the DSL modem 121 to measure a signal-to-noise value at the given time or time period 450 defined with respect to the mutual time reference. Hence, the AF 151 can control, both, the DSL modem 121 as well as the PLC modems 131-133 and thereby provide arbitration and coordination; in particular, coordination can be achieved by provisioning the mutual time reference to, both, the DSL modem 121 and the PLC modems 131-133. This facilitates measuring of the Ssignal-To-Noise (SNR) value in a controlled fashion. In particular, unknown sources of crosstalk and interference can be handled in an efficient manner as the SNR test scenario is controlled in a joint fashion.

In the above scenario, two major cases of topology need to be considered:

Case 1: The DSL channel 111 is used to deliver the broadband to the residence, while the PLC channel 112 is used to distribute the broadband inside the residence. In Case 1, the PLC network 130 is a connected to the DSL CPE 121 via a bridge or router 330 (cf. FIG. 3) and therefore may also be seen as a client of the CPE 121. In some implementations the CPE 121 physically includes one of the PLC modems 131-133 and thus can be connected directly to the PLC network 130.

Case 2: The PLC network 130 is independent from the DSL CPE 121 and does not use DSL broadband to communicate with the outside world. In Case 2, the PLC network 130 is controlled solely by its user, e.g., the resident of the customer premises.

Figure 3:
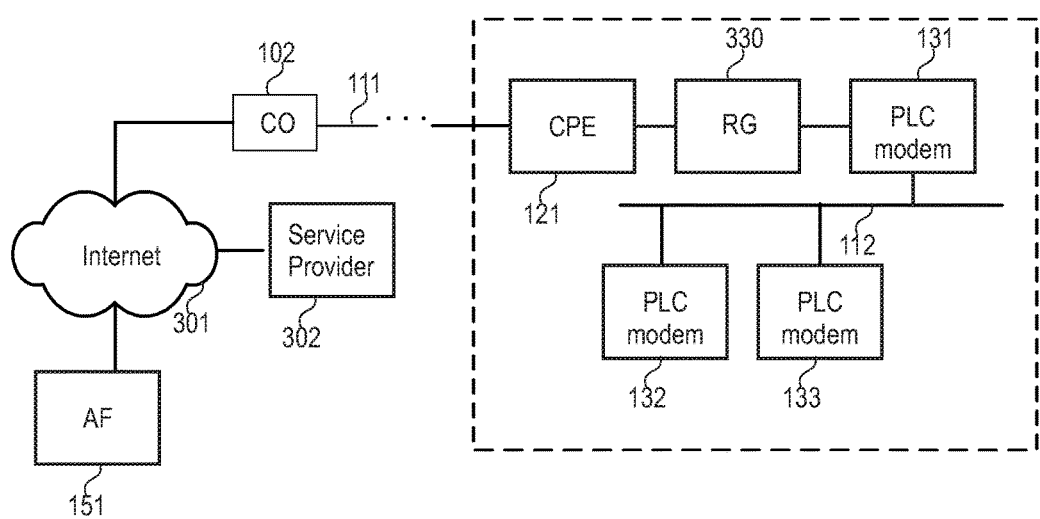
FIG. 3 schematically illustrates a scenario where the DSL channel and the PLC channel co-located and a data connection is established between the DSL channel and the PLC channel.

Case 1 is the most popular; an example functional model of a residential network topology using Case 1 is presented in FIG. 3.

In FIG. 3, the Service Provider delivers broadband services to the user through the DSL channel 111, i.e., from the DSL modem at the CO 102 to the DSL modem 121 implemented by the CPE. The DSL CPE 121 distributes the received broadband services over the residence through the PLC network 130, i.e., employing the PLC channel 112. Broadband is received by user devices, such as computers, TV, VoIP phone, etc. Besides the PLC network, other home networks could be involved in distribution services, such as WiFi.

Generally, the AF 151 may be implemented at any position of the topology. In FIG. 3, the AF 151 reaches the DSL CPE 121 through the connection to the broadband network provided by the DSL channel 111; further, AF 151 can also reach the PLC modems 131-133 of the PLC network 130 via the bridge or router 330 providing connection of the PLC network 130 to the CPE 121. The AF 151 generates a set of management commands that can initiate relevant procedures in the CPE 121 and in the PLC modems 131-133. For the latter, in some embodiments, the AF 151 communicates with a given one of the PLC modems 131-133 implementing a PLC network controller also known as Domain Master. Since AF 151 typically operates at the upper layers of the communication protocol, it may communicate independently with the CPE 121 and with any of the PLC modems 131-133, i.e. independently of each other.

In another embodiment, the AF 151 is connected directly to the management entity of the DSL CO, e.g., as defined in ITU-T Rec. G.997.1. In this case management commands are communicated first to the management entity of the CPE 121 which further generates a management application on upper layer protocol, e.g., TCP-IP to access and control the PLC network. In this described embodiment, the AF 151 is a function of Network Management System that is granted access to both the DSL CPE 121 and the PLC network 130.

Other types of connections employed by the AF 151 are also possible. In all cases the AF 151 has a main task to optimize performance of the overall residential network, comprising the DSL channel 151 and the PLC channel 112, which includes:

ensuring the Quality of Service (QoS) of DSL service, such as bit rate, error performance, impulse noise protection, offered to the customer, i.e., purchased by the customer;

ensure maximum performance and high-quality of the end-to-end path in the PLC network 130 for all required applications, including those delivered by DSL and those which are not.

In both cases as mentioned above, reduction of the crosstalk 190 from the PLC channel 112 into the DSL channel 111 is achieved by reducing the transmit PSD of at least some of the PLC modems 131-133, at least over the frequencies used by the DSL modem 121 for downstream transmission. Generally, the performance of a connection between two particular PLC modems 131-133 depends on its specific routes. Routes assigned to distribute high-speed services need to be provided with higher bandwidth and thus may require a higher transmission PSD—while routes that do not require a high bandwidth can be reduced in transmit PSD to reduce the crosstalk 190 into the DSL channel 111. Generally, optimal selection of the routes in the PLC network 121 under the minimization criterion of reduced crosstalk 190 into the DSL channel 111 is possible.

Hereinafter, details of the techniques of interference mitigation are explained with respect to the two cases as mentioned above. First, reference is made to Case 1.

In Case 1, the PLC network 121 is used to deliver broadband services provided via the DSL channel 111 to the end applications such as TV, computers, etc. Thus, a connection between the PLC network controller or the PLC modems 131-133, respectively, and the AF 151 can be established during Showtime of the DSL channel 111 and also during some parts of DSL Initialization, e.g., during ITU-T Rec. G.994.1 Handshake.

A similar scenario might occur when a new PLC modem 131-133 is plugged into the network or the existing PLC modem 131-133 is moved from one power outlet in the premises to another one.

Figure 4:
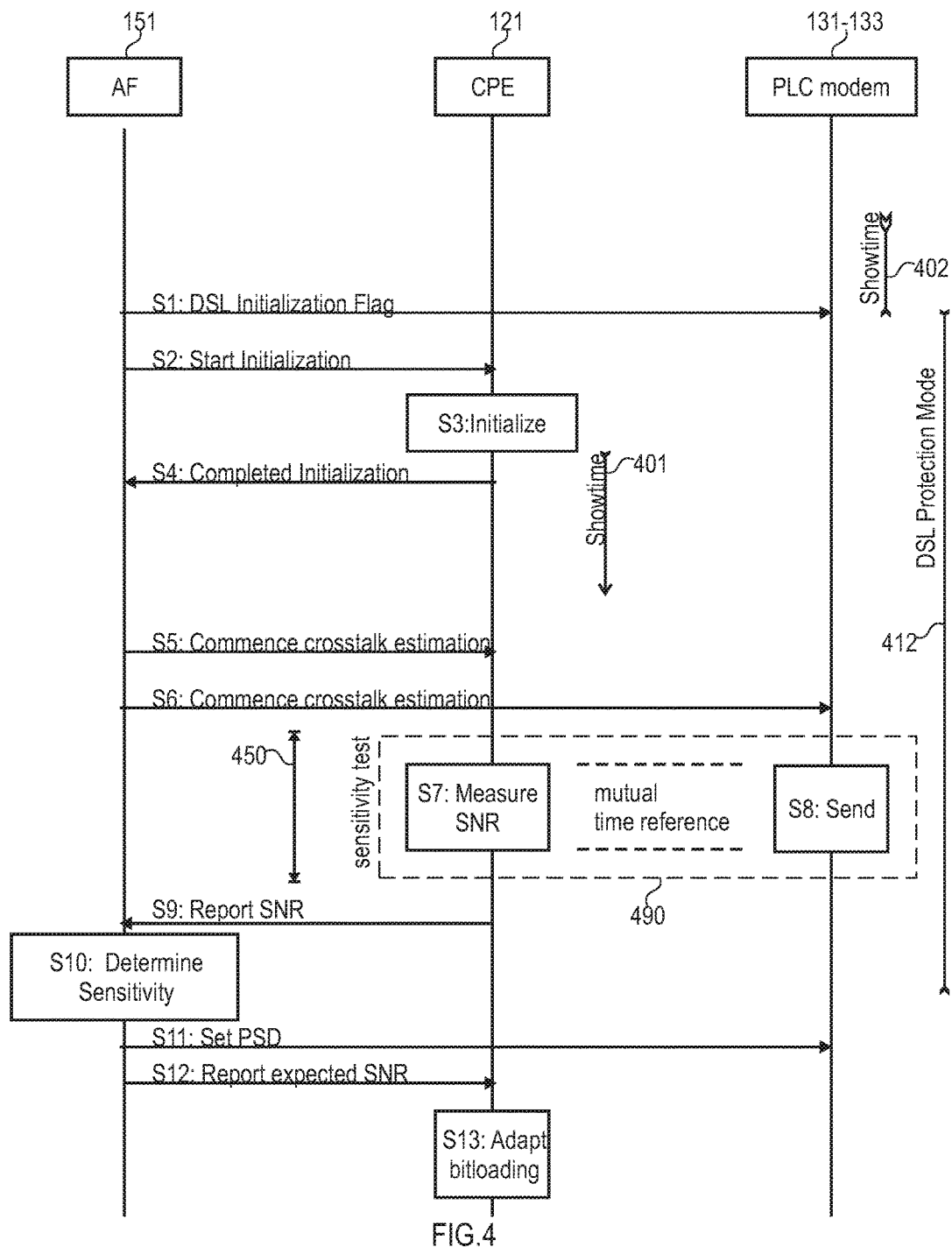
FIG. 4 is a signaling diagram illustrating a DSL protection mode and a sensitivity test according to various embodiments.

Now referring to FIG. 4, the process starts from Initialization of the DSL channel 111. Initialization takes place while the PLC channel 112 is already operating and servicing various internal in-home connections. To prevent destruction of the DSL Initialization at S3 due to strong impact of the PLC network 130, the CPE 121 or the AF 151 communicates to the PLC network controller 131-133 a command indicating the start of DSL Initialization (DSL initialization flag at S1). This command S1 can be communicated during the very first part of DSL Initialization, known as ITU-T Rec. G.994.1 handshake, which is robust and is not expected to be disturbed by the PLC crosstalk 190.

Upon reception of the VDSL initialization flag, all PLC modems 131-133 of the network 130 shall start a "joining of VDSL" procedure 412, also referred to as "DSL protection mode" 412 hereinafter. Parameters and type of this procedure may depend on the particular capabilities of the DSL modem 121, PLC network management, and user requirements, etc. as described below.

In the scenario of FIG. 4, the DSL channel 111 initializes at S3. The Initialization S3 is triggered by control message S2. In the scenario of FIG. 4, there is no time spend to evaluate the crosstalk noise from the PLC modems 131-133 and adjust the transmit PSD of PLC modems 131-133 for required protection of the DSL channel 111 prior to DSL Initialization S3.

Initialization S3 may be a full initialization procedure or a preliminary initialization procedure, e.g., in the case of vectored VDSL—see below.

The crosstalk 190 caused by the PLC network 130 may be comparably high and thus may disturb DSL Initialization S3. To avoid that, all modems 131-133 of the PLC network 130 shall transition into the DSL protection mode 412 by applying a special PSD mask that substantially reduces PLC transmit signal in the frequency range used by DSL downstream on the DSL channel 111. The usually required value of PSD reduction in the DSL downstream bands is 15 dB-25 dB, depending on the applied DSL bandplan and nominal transmit PSD level of the PLC modems 131-130. This defines a minimum transmit power.

The DSL initialization flag S1 is an indication to the PLC network 130 to transition into DSL protection mode 412. This flag S1 can be initiated by the DSL CPE 121 either autonomously or by a request from the DSL CO 102 where the CPE 121 generates the flag during or upon completion of the handshake stage of initialization with the peer VDSL modem at the CO. In the scenario of FIG. 4, flag S1 is a command from the AF 151. It is also possible that the AF 151 pre-provisions corresponding parameters of the DSL Initialization Flag S1 at certain devices, e.g., the DSL CO 102 or the DSL CPE 121. Generally, flag S1 may be sent to the PLC network 130 via the DSL channel 111 and/or through other connections of the PLC network 130 with the outside world, e.g., a mobile telephony network, etc.

After PLC network 130 turns into DSL protection mode 412, the DSL channel 111 initializes in condition of insignificant PLC crosstalk 190 and transitions into Showtime 401 with the required bit rate and other relevant QoS parameters. This is reported to the AF 151 by message S4. After DSL channel 111 transitions into Showtime 401, the AF 151 gets full access to the PLC network 130—via the DSL channel 111—and starts, e.g., by request from the PLC network controller 131-133 the procedure of mutual performance optimization or sensitivity test 490 by sending instructions to commence crosstalk estimation in S5 and S6.

The Sensitivity Test 490 Includes:
Providing a mutual time reference to the PLC network 130 DSL CPE 121; this may be done, e.g., by sending respective control messages from the AF 151 to the CPE 121 and/or the PLC modem(s) 131-133;
At determined time periods 450, known to the DSL CPE 121 and defined in the mutual time reference, the AF 151 requires the PLC modems 131-133 to increase their PSDs in DSL downstream bands by certain amount ΔPSD and transmit data at S8. Usually, the required increase ΔPSD is less than the SNR margin assigned for the DSL CPE 121, so the increase does not cause errors in the DSL channel 111. In some embodiments AF gets a report from the PLC modems 131-133 on when and what PSD level was actually transmitted.
At the same time periods 450, the CPE 121 is required to measure, at S7, the SNR over the downstream tones and report these measurements to the AF at S9;
Based on the CPE reports S9, the AF 151 may allow further increase of PSD in the DSL downstream bands to some PLC modems 131-133, while other PLC modems 131-133 will not be allowed. I.e., the PSD adjustment is done individually for the different PLC modems 131-133. After running the test over the entire PLC network 130, the AF 151 obtains the sensitivity of the DSL CPE 121 to the crosstalk 190 generated by each PLC modem 131-133.
After the sensitivity is learned, at S10 the AF 151 computes the maximum permitted transmit PSD in the DSL downstream band for each PLC modem 131-133. The AF 151 sets the PSD of the PLC modems accordingly at S11. The AF 151 also computes the expected level of the PLC noise or expected noise increase due to PLC noise, respectively, and required noise margin increase for the DSL CPE 121. This is communicated to the CPE 121, S12. The DSL CPE 121 uses these parameters to set at S13 the bit loading which will provide stable operation in the presence of the PLC network 130.

Figure 4A:
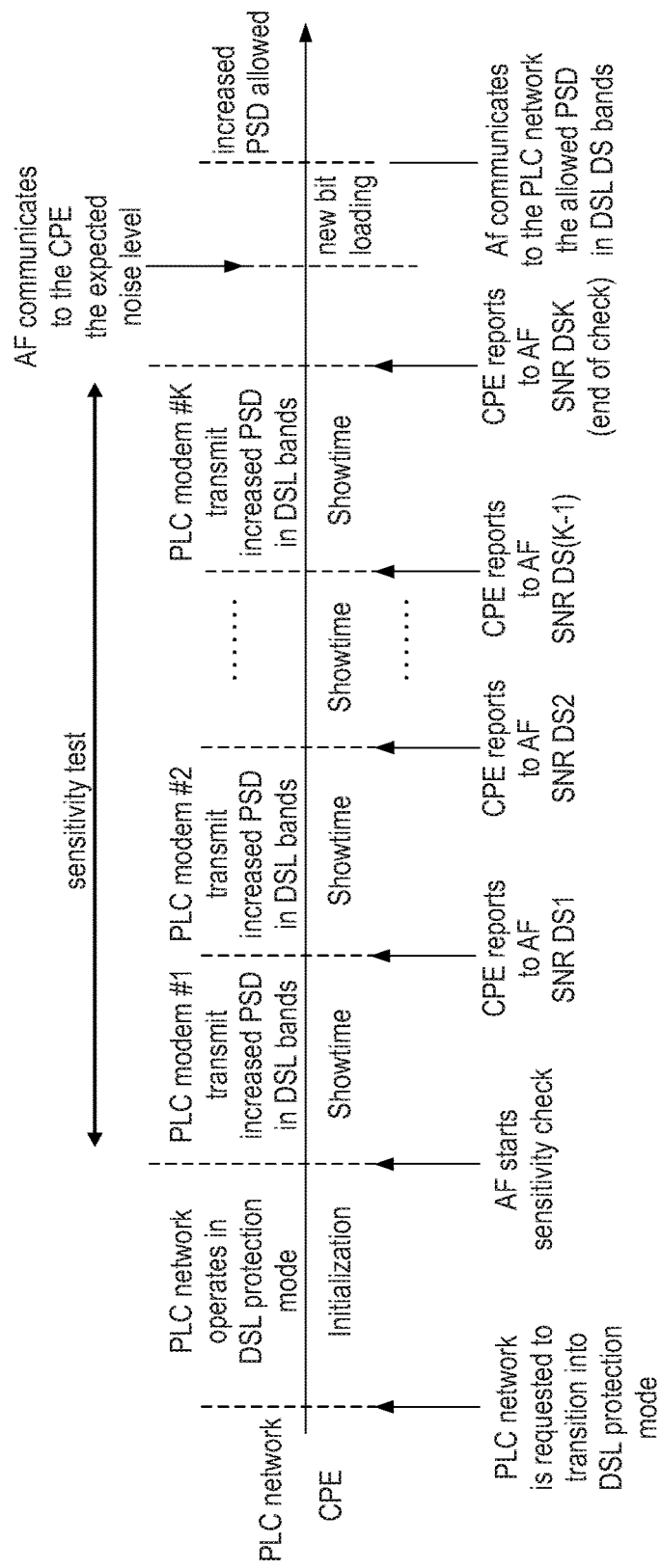
FIG. 4A illustrates a temporal sequence of the sensitivity test at greater detail and according to various embodiments.

An example of the timeline of the procedure is presented in FIG. 4A.

When a new PLC modem 131-133 is attached to the PLC network 130 or a PLC modem 131-133 is moved from one power outlet to another in the premises, it shall first apply the PSD mask corresponding to the DSL protection mode 412. Here, a corresponding control message indicating that a PLC modem 131-133 is newly attached may be sent to the AF 151. Further, the PLC network controller 131-133 may request from the AF 151 to optimize the performance of the newly placed PLC modem 131-133 by using the above procedure. The procedure in this case may be limited to the newly connected or replaced PLC modems 131-133 only.

As can be seen from FIGS. 4 and 4A, in these scenarios the instructions to commence crosstalk estimation S5, S6 are only sent once the control message S4 indicating that the DSL channel 111 is transitioned from Initialization S3 to Showtime 401 has been received. Thus, during the sensitivity test 490 the DSL channel 111 operates at Showtime 401. Said sending of the instructions to commence crosstalk estimation S5, S6 is therefore executed during Showtime 401 of the DSL channel 111, preferably via the DSL channel 111 itself (see FIG. 3).

Executing the sensitivity test 490 only after the DSL channel 111 has initialized at S3 allows to quickly commence data transmission on the DSL channel 111.

As can be seen from the above, a control message S9 indicating the measured SNR value is received by the AF 151. The AF 151 is configured to compute a value of the maximum transmit PSD in consideration of the measured SNR value. Then, the AF 151 is configured to send the control message S11 to the corresponding PLC modems 131-133, said control message S11 indicating the computed value of the maximum transmit PSD and prompting the respective PLC modems 131-133 to execute data transmission on the PLC channel 112 employing the value of the maximum transmit PSD.

In some cases, a reduction of the transmit PSD of transmission on the PLC channel 111 is not sufficient to maximize the throughput between the service provider and the application: better results may be achieved if some DSL parameters are adjusted in the aim to share the performance loss between the DSL and the PLC network 130. One example is when sufficient reduction of the transmit PSD of a PLC modem 131-133 is so high that it severely degrades performance of data transmission on the PLC channel 112 and doesn't allow to deliver service with appropriate speed or latency. Among many potentially suitable DSL parameters, those which do not require re-initialization of the DSL channel 111 are preferable.

It is known to generate Showtime-Adaptive Virtual Noise (SAVN), also known as Reference Virtual Noise (RVN), by the head-end of the DSL line, e.g. the CO 102, to determine bit loading and respectively, the throughput in the presence of the external noise. The generated value of the SAVN is based on the actual external noise measured at the receiver and may be derived from the associated reported values of SNR at S9. The SNR margin SNRM may be used. In case of the downstream, the SNR is measured at the DSL CPE 121 and reported to the head-end, and the downstream SAVN is derived from the downstream SNR reports. Further, the computed downstream SAVN is communicated to the CPE 121 via DSL embedded operation channel (eoc).

In case of DSL line throughput is optimized in presence of the PLC network 130, the DSL parameters are estimated and reconfigured by the AF 151, e.g., control of service provider. By tweaking these parameters, the overall throughput may be increased. In one embodiment, the AF 151 estimates, at S10, the expected actual noise at the CPE 121 based on the sensitivity measurements, computes the associated value of SAVN, and communicates this proposed value of the downstream SAVN to the DSL head-end; e.g. the proposed SAVN may be indicated by the control message S12. The final decision may be taken by the DSL head-end, under control of service provider. This communication can be done via the eoc or via another communication channel available.

In another embodiment, the AF 151 communicates the actual status of the noise generated by the PLC channel 112 to the service provider entity, such as network management system (NMS), and the NMS generates controls to the DSL head-end allowing adjusting downstream SAVN.

As will be appreciated from FIGS. 4 and 4A, it is possible that during the sensitivity test payload data is transmitted via the DSL channel 111 as the DSL channel 111 is operated in Showtime 401. Thus, the measured SNR of S7 may be influenced by properties of the transmit signal on the DSL channel 111. Likewise, generally it is possible that the PLC channel 112 is used for transmission of payload data in DSL protection mode 412; i.e., albeit at reduced PSD, it is possible to operate the PLC network 130 for transmission of payload data when executing the sensitivity test.

Sometimes, it may be desirable to achieve a more accurate control of the crosstalk 190 into the DSL channel 111.

This may be achieved by direct estimation measuring of the crosstalk 190 between each PLC modem 131-133 and DSL CPE 121. This can be done when the DSL channel 111 is quiet. Generally, this may be the case prior to the DSL Initialization, i.e., where no DSL signal present on the channel 111. However, such a scenario may not be applicable or only be applicable to a limited degree—as explained below—for DSL channel 111 that uses vectoring. This is because uncompensated self far end crosstalk (FEXT) from other lines in the binder may be comparable with the crosstalk from the PLC network 130 or even higher, and thus may mask out the crosstalk 190 from the PLC network 130. For vectored VDSL, PLC crosstalk estimation may be done during the Showtime 401, e.g., as discussed with respect to FIGS. 4, 4A.

Further, it may also be possible to measure the crosstalk 190 between each PLC modem 131-133 when the DSL channel 111 is quiet and operating in Showtime 401; this may be the case, e.g., where data transmission via the DSL channel 111 relies on time multiplexing. Then, it may be possible that the instructions to commence crosstalk estimation S5 prompt the DSL modem 121 to mute transmission on the DSL channel 111 at the given time or time period 450. Such a scenario may also be applied to a DSL channel 111 which relies on vectoring.

Generally, the SNR value reported at S9 in a case where the measurement of S7 is executed during the time or time period 450 where the DSL channel 111 is quiet may be referred to as Quiet Line Noise (QLN).

Figure 5:
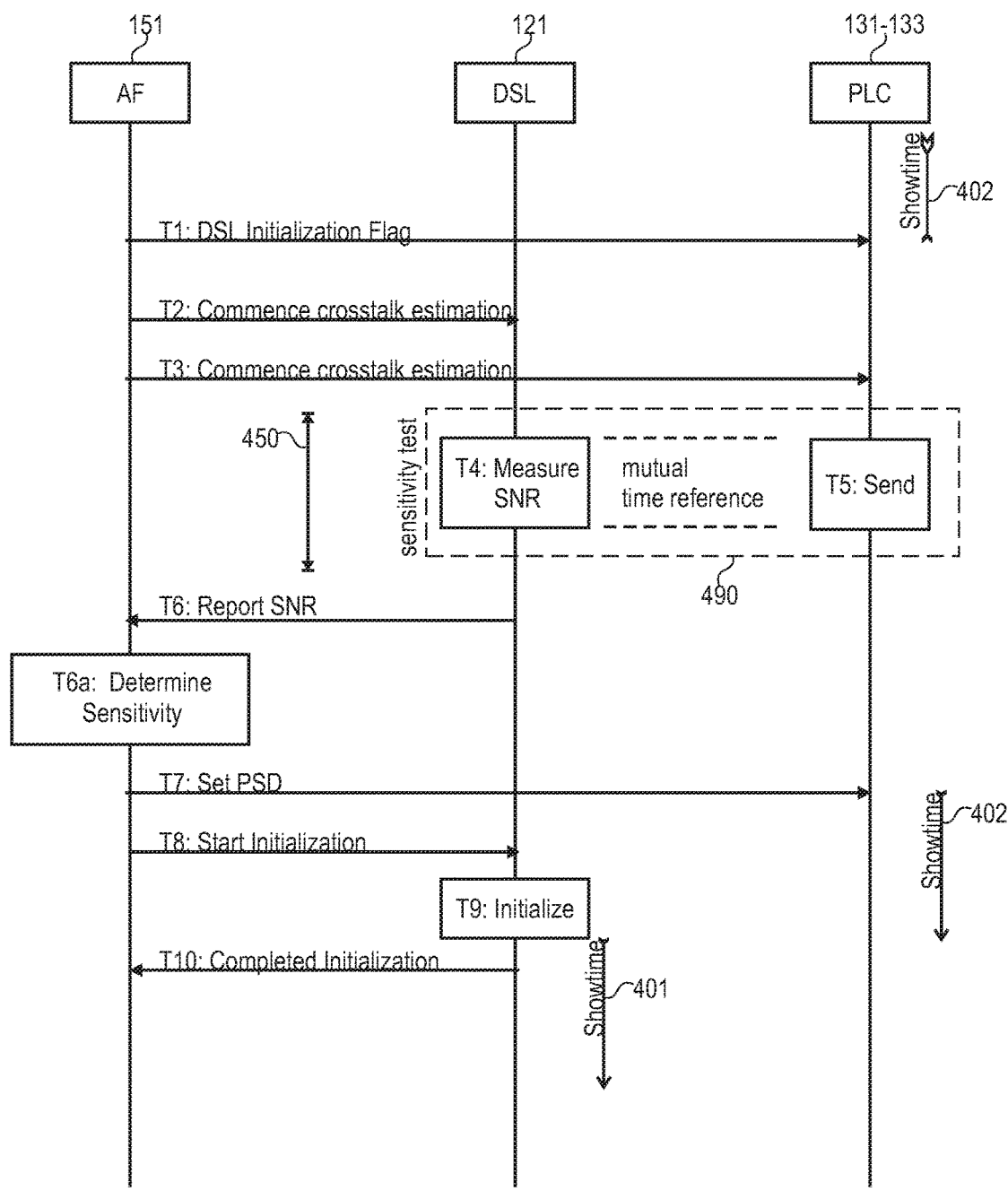
FIG. 5 is a signaling diagram illustrating the DSL protection mode and the sensitivity test according to various embodiments.

Now referring to FIG. 5, a scenario is illustrated where the sensitivity test 490 is executed prior to Initialization of the DSL channel 111 at T9.

Here, T1 corresponds to S1, T2 corresponds to S5, and T3 corresponds to S6 (cf. FIG. 4).

For crosstalk estimation, the PLC modems 131-133 transmit a signals pattern; the signal pattern provides the time periods 450 dedicated for transmission of every PLC modem 131-133 using nominal transmit PSD for communication to all other PLC modems 131-133. The same PLC modems 131-133 can use different PSD levels to communicate with different peers in the PLC network 130. Each transmission at T5 should be long enough so that DSL CPE 121 has sufficient time to estimate the change in QLN caused by this transmission on frequencies belonging to the DSL downstream band. The required time is usually few DSL superframes, e.g., 64 ms each. The AF 151 or the DSL CPE 121, depending on the scenario, provides the time stamps triggered by the AF 151 associated with the PLC test signal pattern for both the PLC modems 131-133 and for the DSL CPE 121. The PLC network controller 131-133 may associate PLC modem transmissions with the times or time periods 450. The DSL CPE 121 shall measure the QLN or the increase of the QLN, or both at T4. Further, DSL2 CPE communicates at T6 the value of the measured QLN, e.g., together with associated times or time periods, to the AF 151, so that the AF 151 can associate each QLN value with a particular transmitting PLC modem 131-133.

In some embodiments, the PLC network controller 131- 133 may also communicate the transmit PSD together with the associated times or time periods 450 to the AF 151, and the AF 151 associates the QLN value or increase of PSD with the PLC modem 131-133 transmitting the time or time period of QLN measurement and the specific PSD that was used by the PLC modem 131-133.

Since the DSL channel 111 is not initialized when executing the sensitivity test 490, the communication of the QLN can be done by the out-of-band means, such as ITU-T Rec. G.994.1 handshake communication protocol or by using a technology similar to VDSL2 Loop Diagnostic mode (DELT) defined in G.993.2. The latter allows establishing a robust communication between the DSL CO 102 and CPE 121, using a Special Operations Channel (SOC), e.g., as defined in ITU-T Rec. G.993.2. The QLN may also be stored by the CPE 121 during the measurement period at T4 and communicated to the AF later, during Showtime 401—in this case PLC network 130 should be transitioned into DSL protection mode 412 upon starting of the Initialization of the VDSL Channel, T8, T9, T10.

In summary, the crosstalk estimation according to FIG. 5 includes the following steps:
- The DSL CPE 121 and the PLC network controller 131-133 are provided with the mutual time reference, e.g., at T2, T3, or by separate control messages;
- Prior DSL link Initialization at T9, the AF 151 or the CPE 121 sends to the PLC network 130 a flag T2 "start PLC crosstalk estimation";
- Upon reception of the flag T2, the PLC network 130 starts transmission of a dedicated signal pattern, at times or time periods 450 known by the DSL CPE 121 or synchronized with the DSL CPE 121 and defined within the mutual time reference; the DSL channel 111, during these times or time periods 450, stays quiet; in some embodiments the AF 151 also gets the time stamp of each PLC transmission and the associated PSD as this allows for a more flexible test pattern, e.g., interleaved with actual data transmissions one the PLC channel 112;
- The DSL CPE 121 measures the QLN for each time or time period 450 and communicates the measured values T6 to the AF 151, e.g., with the corresponding time or time period 450;
- The AF 450 computes the optimized value of the PSD for each of the PLC modems for the frequencies used by the DSL downstream at T6a; a respective control message T7 is sent. The AF 151 may also compute the expected PLC noise value or expected maximum PLC noise value and pass it to the DSL CPE 121 for computation of bit loading to be used during Showtime 401.

In embodiments that use a direct connection between the DSL CPE 121 and the PLC network 130 as shown in FIG. 3, the DSL CPE 121 can provide the PLC network 130 with the mutual time reference and generate for the PLC network controller 131-133 a "start PLC crosstalk estimation" flag T3. This way, the crosstalk estimation can be initiated without AF 151 present. The AF 151 may pre-provision certain parameters of the procedure.

In one embodiment, the PLC network controller 131-133 can run the crosstalk test pattern autonomously, using predefined times or time periods 450 for each PLC modem 131-133 to transmit. In another embodiment, every step of the test signal is initiated and performed separately: the AF 151 or the DSL CPE 121 passes to the PLC network 130 a command "start step #k of test pattern" by which PLC modem #k 131-133 starts transmitting the part #k of the test signal pattern. As the part #k is over, the DSL CPE 121 gets the measured QLN k and sends it to the AF 151 or stores for being sent later with the associated time or time period 450. Further, the PLC network 130 gets a command to start the next step of the test pattern. The timing diagrams showing both techniques of the PLC crosstalk estimation as explained above are presented in FIGS. 5A and 5B.

Figure 5A:
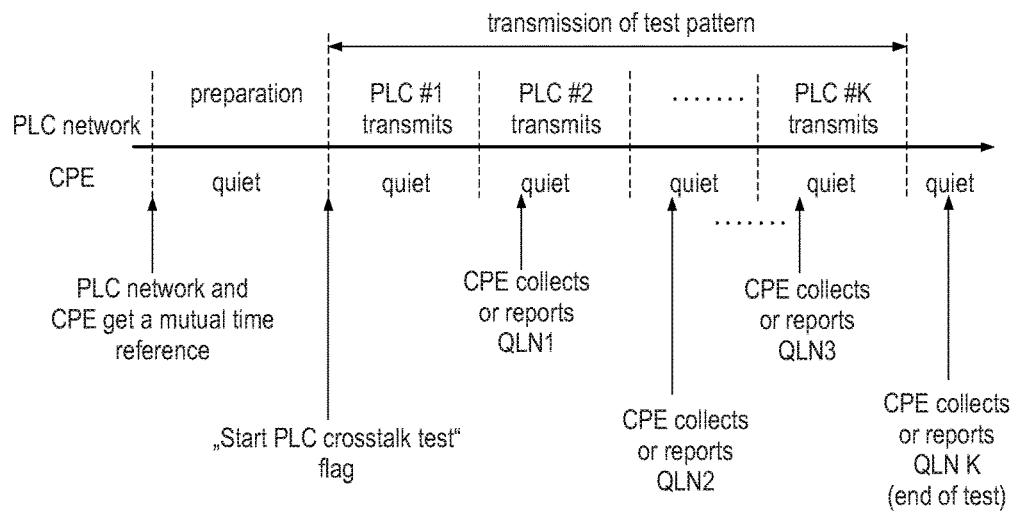
FIG. 5A illustrates a temporal sequence of the sensitivity test at greater detail and according to various embodiments.
Figure 5B:
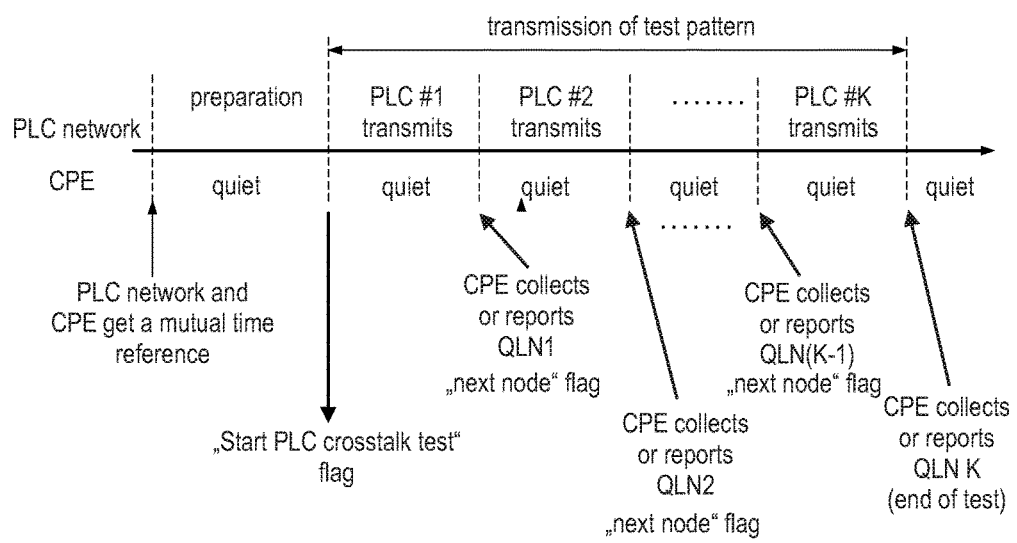
FIG. 5B illustrates a temporal sequence of the sensitivity test at greater detail and according to various embodiments.

In the example timeline presented in FIG. 5A, the case is shown where the test pattern is passed from one PLC modem 131-133 to another one autonomously while the DSL CPE 121 collects the value of QLN every time it detects a change in the measured QLN value. In FIG. 5B, the DSL CPE 121, directly or through the AF 151, controls the start/stop of each parts of the test pattern with a "Next node" flag and collects QLN at completion of every part. The "Next node" flag initiates the test sequence in the next PLC modem 131-133.

Note that in the case of FIG. 5B where the test pattern steps are controlled by the CPE 121, the PLC network controller 131-133 shall pass the "Next node" signal to the corresponding PLC modem 131-133. The transmission time used by the network controller to facilitate this transition shall be excluded from the QLN estimation.

The time required for crosstalk measurement maybe rather significant: assuming 3 superframes transmission time for each node and 10 PLC modems 131-133 in the network, there will be 90 transmission combinations, i.e., 270 superframes (270×64 ms=17.3 seconds). This time is substantial, but still practical.

Hereinafter, various aspects applicable to the abovementioned scenarios are explained at greater detail.

Figure 6:
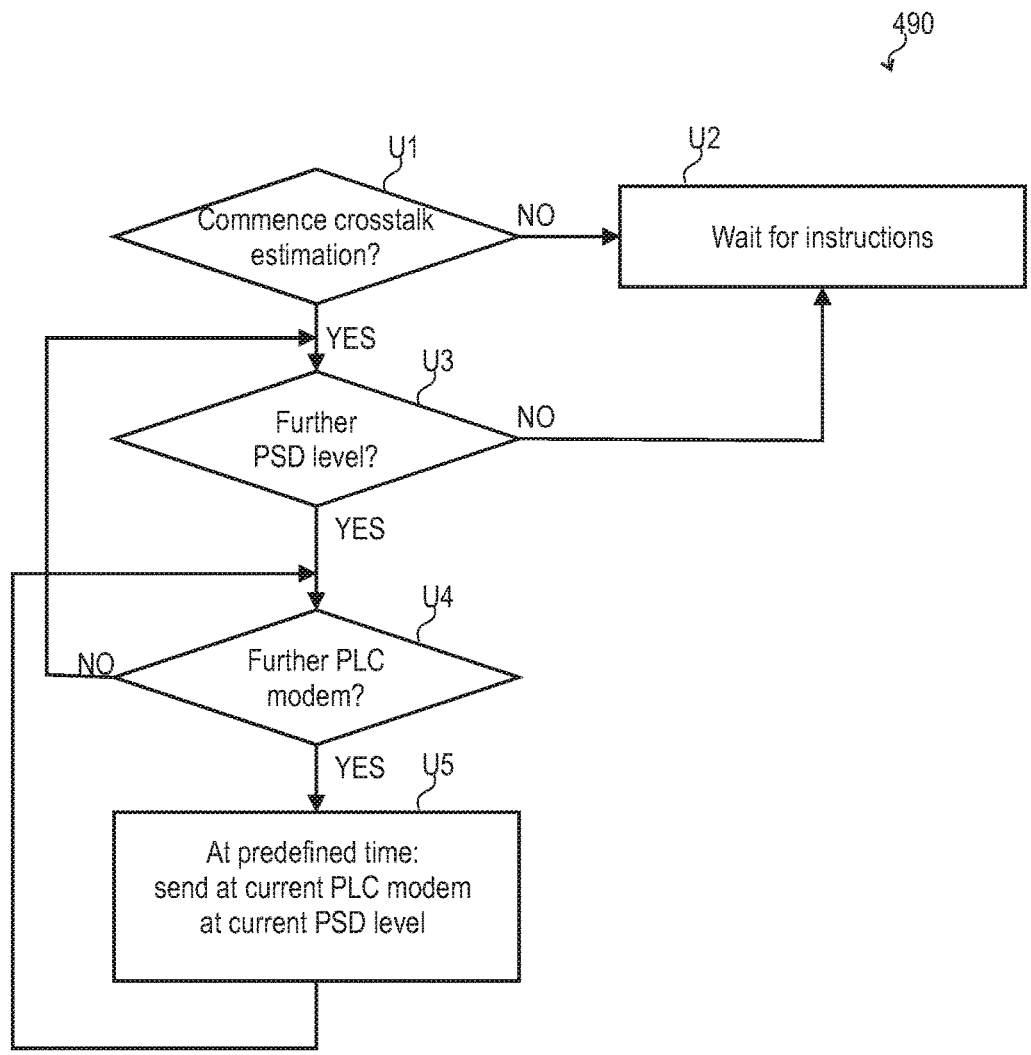
FIG. 6 is a flowchart illustrating the sensitivity test at greater detail.

Sensitivity Test:

In FIG. 6, details of the sensitivity test 490 are illustrated by means of a flowchart. At U1, it is checked whether crosstalk estimation should commence, e.g. at U1, it may be checked whether the command S6, T3 to commence crosstalk estimation has been received by the PLC network controller, or by one of the PLC modems 131-133, respectively. If this is not the case, the method commences at U2 where new instructions are awaited.

However, if it is determined at U1 that crosstalk estimation should commence, at U3 a first PSD level is selected. Typically, at the first iteration of the sensitivity test 490, a minimum PSD 700 (see FIG. 7) is selected; for this, the transmit PSD 700 is typically initially decreased from a level used during Showtime on the PLC channel 112 for reliable data transmission.

Next, at U4, it is checked whether one of the PLC modems 131-133 for which the sensitivity test 490 needs to be executed is remaining in the queue. Generally, as noted above, it is not necessary to execute the sensitivity test for all PLC modems 131-133 of the PLC network 130. This is because it is known that not all PLC modems 131-133 installed in the same premises as the DSL channel 111 have the same crosstalk 190 or impact on the DSL channel 111. This is due to the different locations of the various PLC modems 131-133 with respect to the point of coupling. Therefore, some of the PLC modems 131-133 may create a comparably small interference 190 on the DSL channel 111; such PLC modems 131-133 typically need not to be included in the sensitivity test 490 and can work full power. Others of the PLC modems 131-133 may cause a bigger interference 190. In this regard, it is possible, for each one of the plurality of PLC modems 131-133 of the PLC channel 112, to determine an expected crosstalk with the DSL channel 111. The instructions to commence crosstalk estimation S6, T3 may be selectively sent to those PLC modems 131-133 which have an expected crosstalk above a predefined threshold. Where the transmit PSD of each PLC modem 131-133 in the frequency band employed for transmission on the DSL channel 111 is adjusted individually, it is possible to achieve a mutual optimization between the DSL performance and the PLC performance.

Again referencing to FIG. 6, at U5, the current PLC modem 131-133 selected at U5 transmits at the current PSD level selected at U3. As mentioned above, U5 may be either autonomously triggered, e.g., by the PLC network controller 131-133, or may be remotely triggered, e.g., by the AF 151.

It is generally also possible that the given time or time period 450 during which the respective PLC modem 131-133 transmits is pre-provisioned in a local storage of the corresponding PLC modem 131-133; this facilitates autonomous operation of the PLC network 130 during the sensitivity test 490. This may be of benefit where the AF 151 doesn't have access to a communication channel to the PLC network 130.

After execution of U5, U4 is executed anew and it is checked whether a further PLC modem 131-133 remains in the queue. If this is not the case, step U3 is executed anew and it is checked whether a further PSD level to be checked is in the queue. If this is not the case, the sensitivity test 490 ends and the method commences with step U2.

In FIG. 6, loops defined by U3 and U4 may be interchanged.

Figure 7:
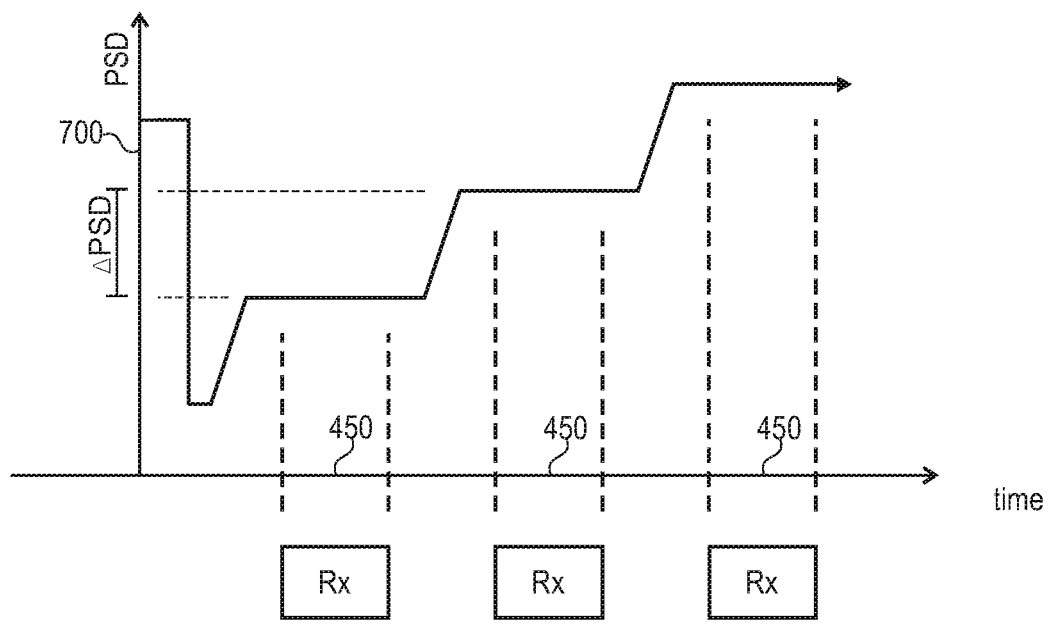
FIG. 7 is a plot of the power spectral density over time as controlled as part of the sensitivity test.

As can be seen from the above, the instructions to commence crosstalk estimation S6, T3, prompt the PLC modems 131-133 to iteratively increase, starting from the minimum PSD 700, the transmit PSD of the data transmission on the PLC channel 112 at a plurality of times or time periods 450 defined with respect to the mutual time reference and by a predetermined amount ΔPSD, see FIG. 7. The further instructions to commence crosstalk estimation S5, T2, correspondingly prompt a DSL modem 121 to measure the SNR value respectively at each one of the plurality of times or time periods 450 defined with respect to the mutual time reference (indicated in FIG. 7 as Rx).

Figure 8:
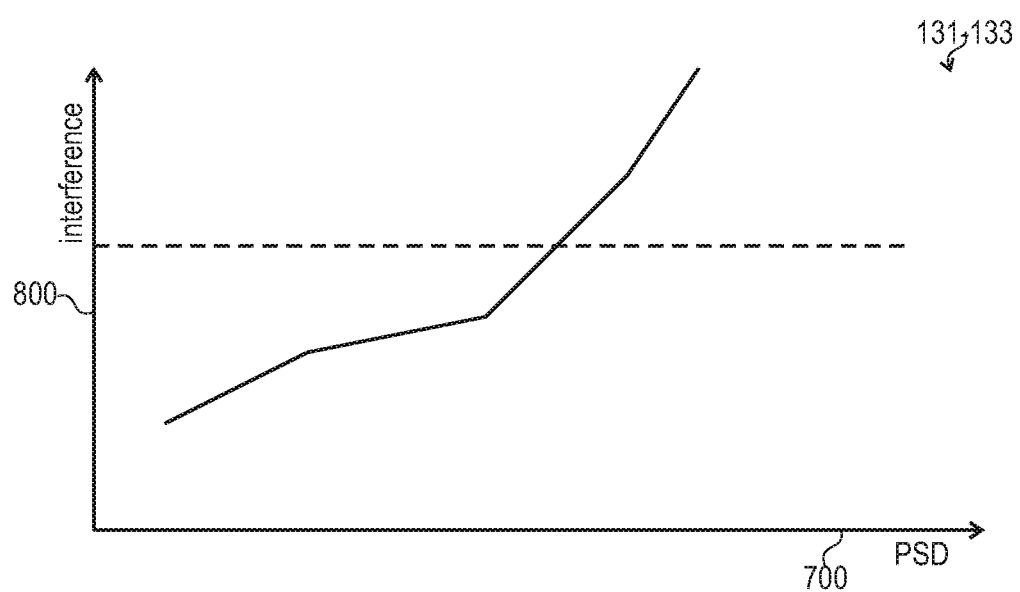
FIG. 8 is a plot of the interference as a function of power spectral density as measured during the sensitivity test.

By such techniques it becomes possible to estimate the expected interference 800 of the PLC network 130 into the DSL channel 111 as a function of the PSD 700 of each PLC modem 131-133 (see FIG. 8). Thus, it becomes possible to determine the transmit PSD 700 for each one of the PLC modems 131-133 individually, e.g., by comparing the estimated interference 800 with a predefined threshold (indicated in FIG. 8 by the dashed horizontal line). Thus, by such techniques as presented above it is possible to determine the actual impact on the DSL channel 111; in particular, it is possible to estimate the actual impact generated by each one of the PLC modems 131-133. It is possible that these estimations are passed to the AF 151 which controls the spectrum and transmit PSD of the PLC modems 131-133, providing minimum performance degradation in the PLC network 130 for the given performance degradation of the DSL channel 111.

Such an estimation of the expected interference 800 is generally possible based on the QLN value, i.e., by executing the sensitivity test 490 prior to the Initialization and Showtime 401 of the DSL channel (cf. FIG. 5), and possible as well by measuring the SNR during Showtime 401 of the DSL channel 111 (cf. FIG. 4).

Initialization in Vectored DSL:

The estimation using QLN, as described with respect to FIGS. 5, 5A, 5B is applicable to a limited extent to the case of vectoring which may be applied in future deployments. This is because prior to the completion of the initial two phases of Initialization at T9, which is the majority of initialization time budget, the QLN on the new line is mainly the FEXT from other lines. This FEXT masks the impact of PLC interference 190 on the value of QLN. When FEXT is cancelled after completion of Initialization at T9, the impact of the PLC interference 190 may be strong enough to prevent initialization of DSL channel 111: if the bit rate that could be achieved in presence of PLC interference 190 is less than one defined by the operator, the DSL channel 111 will not initialize and will drop Initialization.

A way to prevent this is to use pre-initialization, i.e., to preliminary start the DSL channel 111 with a preliminary Initialization sequence using very low or none performance targets. After completion of preliminary Initialization, the DSL channel 111 transitions into Showtime 401 and performs PLC crosstalk estimation explained with respect to FIGS. 4, 4A, i.e., by executing the sensitivity test 490. After the sensitivity test 490 is complete, the AF 151 defines the "DSL protection mode" 412 for the PLC network 130 by applying reduced PSDs to the PLC modems 131-133 based on the results of the estimation.

After PLC modems 131-133 apply to DSL protection mode 412, the AF 151 allows the DSL CPE 121 to re-initialize, using normal initialization parameters necessary to perform the services desired by the operator.

In one embodiment, the described pre-initialization could be implemented by using so called "Loop Diagnostic Mode" or so called DELT, see ITU-T Rec. G.996. The used pre-initialization procedure shall be followed by the sensitivity test 490 followed by application of DSL protection mode 412 to PLC modems 131-133 followed by normal initialization, i.e., re-initialization of the DSL channel 111. The described chain of procedures may be controlled by the AF 151.

The DSL Protection Mode:

As can be seen from the above, albeit with respect to FIGS. 4, 4A, as well as with respect to FIGS. 5, 5A, 5B, specific series of events have been described—in particular with respect to the sensitivity test 490 and the Initialization of Showtime 401 of the DSL channel 411—it is possible to execute such events in a different sequence and/or multiple times.

The DSL protection mode 412 mentioned above is associated with a predetermined minimum PSD setting that PLC modems 131-133 are turned into upon its Initialization; this may involve a reduction of the transmit power from a prior level during operation. This mode 412 can be abandoned if no DSL channel 111 is installed. In some embodiment, the "DSL protection mode" 412 may be parameterized, so that DSL CPE 121 can pass the particular parameters of the DSL protection mode 412 to the PLC network 130. For instance, if the DSL CPE 121 does not use one of the downstream bands, there is no need to suppress the PSD of the PLC modem 131-133 on frequencies of this unused band. For more accurate parameterization, DSL CPE 121 can estimate and send to the PLC network 130 the required maximum PSD reduction in each of the DSL downstream bands by estimation some channel characteristics of the DSL channel 111 during early stages of Initialization. For instance, attenuation of the line—for lines with low attenuation, e.g., up to 30 dB, PLC crosstalk 190 is usually not an issue. The maximum attenuation of PLC signal in downstream bands is often beneficial to standardize—in the aim to avoid "selfishness" of the DSL CPE 121, i.e., the predetermined minimum transmit PSD.

After completion of the DSL protection mode, it may be possible to increase the transmit power. In particular, it may be possible to increase the transmit power to a level determined during as determined during the sensitivity test 490. E.g., the PSD of the PLC channel 112 may be set to a value where an error rate of the DSL channel 111 is expected to be tolerable; e.g., the error rate may be expected to be below a certain threshold fulfilling QoS requirements. In this regard, it may also be possible that after completion of the DSL protection mode the transmit power needs to be further reduced, e.g., because initially the predefined minimum transmit power had not been established correctly.

Communication with the PLC Network:

Referring to FIG. 2, Case 2 involves that PLC network 130 is fully independent from the DSL CPE 121—it doesn't distribute DSL broadband and has no connection to the outside world. The PLC network 130 can be controlled only by its user—the resident of the customer premises. When user is willing to pass the control and optimization of the PLC network 130 to the AF 151, the user shall connect (bridge) the DSL CPE 121 to the PLC network 130 by either associating the PLC port of the CPE 121 (if available) with its PLC network 130 or by bridging the broadband port of the PLC network controller to the DSL CPE 121, e.g., CPE 121 and of the PLC modems 131-133 are connected to the ports of the same bridge or router. Then, as explained above, prior to Initialization of the DSL channel 111, the PLC network 130 shall be transitioned into "DSL protection" mode 412. When the PLC network 130 is kept fully autonomous, but it is desired to maintain high performance of the DSL line, the PLC network 130 should be operated in "DSL protection" mode 412. Otherwise, substantial reduction in performance of the DSL channel 111 due to non-stationary crosstalk noise generated by the PLC network 130 may result.

Effects:

As can be seen from the above, the application presents techniques that can mitigate the PLC interference 190 into the DSL channel 111 in a manner where, both, the DSL system as well as the PLC system take the penalty in a shared manner. This allows providing overall good performance in the premises, as, e.g., the bandwidth obtained from the DSL channel 111 may be distributed by the PLC network 130 effectively. Thus, the present application provides various benefits over prior reference implementations. According to one reference implementation it is possible to switch off transmissions on the PLC channel 112 and/or reduce the transmit PSD in parts of the spectrum that overlap with the DSL receive signal on the DSL channel 111. According to this reference implementation, the PLC interference 190 is effectively reduced, however, at the same time considerable parts of the frequency spectrum employed for transmission on the PLC channel 112 are disabled whereby the performance of the PLC network 130 is considerably reduced.

According to a further reference implementation, a probe signal is activated in the PLC network 150 during Initialization of the DSL modem 121 by means of an established communication channel between the PLC network 130 and the DSL CPE 121. In this manner, the DSL modem 121 can accommodate the noise of the PLC channel 112 and it does not react on the PLC transmission. However, transmission via the DSL channel 111 will experience a high performance loss as all the burden of the mutual interference 190 is taken by the DSL channel 111. Further, results may change substantially when one of the PLC modems 131-133 is moved from one power outlet to the other.

As can be seen from the above, the disadvantage of the reference implementations is that the mutual coexistence between DSL and PLC is provided by a severe performance penalty on one of them, while another one experience none or minimal performance loss. According to techniques as proposed above, both systems suffer in a controlled manner, i.e., the level of suffering is controlled. However, this control is not present in the reference implementation—since PLC and DSL are fully independent and may not be deployed by the same provider, each system will seek better conditions for itself by reducing performance of the other system. This situation is also rather unstable, unless there is a third party arbitration or some mutual criterion.

While the invention has been shown and described with respect to certain preferred embodiments, equivalents and modifications will occur to others skilled in the art upon reading and understanding of the specification. The present invention includes also equivalents and modifications and is limited only by the scope of the appended claims.

For example, various embodiments above have been illustrated for scenarios where the AF is not co-located with any one of the DSL modem and the PLC modem(s). Thus, corresponding control messages may be exchanged by sending and receiving over a suitable communication channel, e.g., the DSL channel. However, similar scenarios may be readily applicable to scenarios where the AD is co-located with at least one of the DSL and the PLC modem(s); then control messages may be provided/obtained by internal/logical interfaces.

Further, it should be understood that while various embodiments have been explained with respect to VDSL, similar techniques may be readily applied to other DSL technologies (xDSL). DSL technology as used herein covers all DSL flavors including Asymmetric DSL (ADSL), ADSL2+, High Data Rate DSL (HDSL), Symmetrical DSL (SDSL), VDSL, VDSL2, Universal Asymmetric DSL (UADSL), and the upcoming G.fast.

The invention claimed is:

1. An apparatus to mitigate interference between a Digital Subscriber Line, DSL, device and a Power Line Communication, PLC, device, said apparatus configured to:
   provide, to the PLC device, a first instruction to increase a transmit power of data transmission of the PLC device during a measurement period,
   provide, to the DSL device, a second instruction to measure a signal-to-noise value during the measurement period, and
   provide, to the PLC device and to the DSL device, a mutual time reference in which the measurement period is defined.

2. The apparatus of claim 1, wherein the apparatus is further configured to:
   receive, from the PLC device, an indication of the measurement period and the transmit power.

3. The apparatus of claim 1,
   wherein the apparatus is part of a network management system, or
   wherein the apparatus is co-located with either the DSL device or the PLC device.

4. The apparatus of claim 1,
   wherein the apparatus is configured to provide the first instruction as part of a sensitivity test.

5. The apparatus of claim 1, wherein the apparatus is further configured to:

obtain a control message indicating that the DSL device is transitioned from Initialization to Showtime, and provide the first instruction while the DSL device is operating in Showtime.

6. The apparatus of claim 1, wherein the first instruction is to increase the transmit power of the data transmission of the PLC device from a predetermined minimum transmit power.

7. The apparatus of claim 1, wherein the apparatus is further configured to provide, to the DSL device, a third instruction to initiate a crosstalk estimation.

8. The apparatus of claim 1, wherein the apparatus is further configured to provide, to another PLC device, a fourth instruction to reduce a transmit power of data transmission of the another PLC device during the measurement period.

9. The apparatus of claim 1, wherein the apparatus is further configured to provide the first instruction to a plurality of PLC devices depending on an expected interference from the PLC devices.

10. The apparatus of claim 1,
wherein the apparatus is further configured to obtain, from the DSL device, an indication of the signal-to-noise value measured during the measurement period, and
wherein the apparatus is optionally configured to compute a value of a set transmit power for use by the PLC device in consideration of the measured signal-to-noise value.

11. The apparatus of claim 1, wherein the apparatus is further configured to provide, to the PLC device, a fifth instruction to reduce the transmit power of the data transmission to a set transmit power, at least for frequency bands used by the DSL device.

12. The apparatus of claim 1, wherein the first instruction to increase a transmit power comprises an instruction to increase the transmit power gradually, thereby establishing a plurality of different transmit power values during the measurement period.

13. The apparatus of claim 12, wherein the second instruction to measure a signal-to-noise value comprises an instruction to measure the signal-to-noise value for each of the plurality of different transmit power values during the measurement period.

14. The apparatus of claim 13, wherein the signal-to-noise values associated with different transmit power values collectively comprise a sensitivity of the DSL to crosstalk.

15. The apparatus of claim 14, the apparatus further configured to provide, to the PLC device, a maximum permitted transmit power based on the sensitivity.

16. A method of mitigating interference between Digital Subscriber Line, DSL, device and a Power Line Communication, PLC, device, said method comprising:
providing, to the PLC device, a first instruction to increase a transmit power of data transmission of the PLC device during a measurement period,
providing, to the DSL device, a second instruction to measure a signal-to-noise value during the measurement period, and
providing, to the PLC device and to the DSL device, a mutual time reference in which the measurement period is defined.

17. The method of claim 16, further comprising:
receiving, from the PLC device, an indication of the measurement period and the transmit power.

18. The method of claim 16, further comprising:
obtaining a control message indicating that the DSL device is transitioned from Initialization to Showtime, and
providing the first instruction while the DSL device is operating in Showtime.

* * * * *